Figure 1:
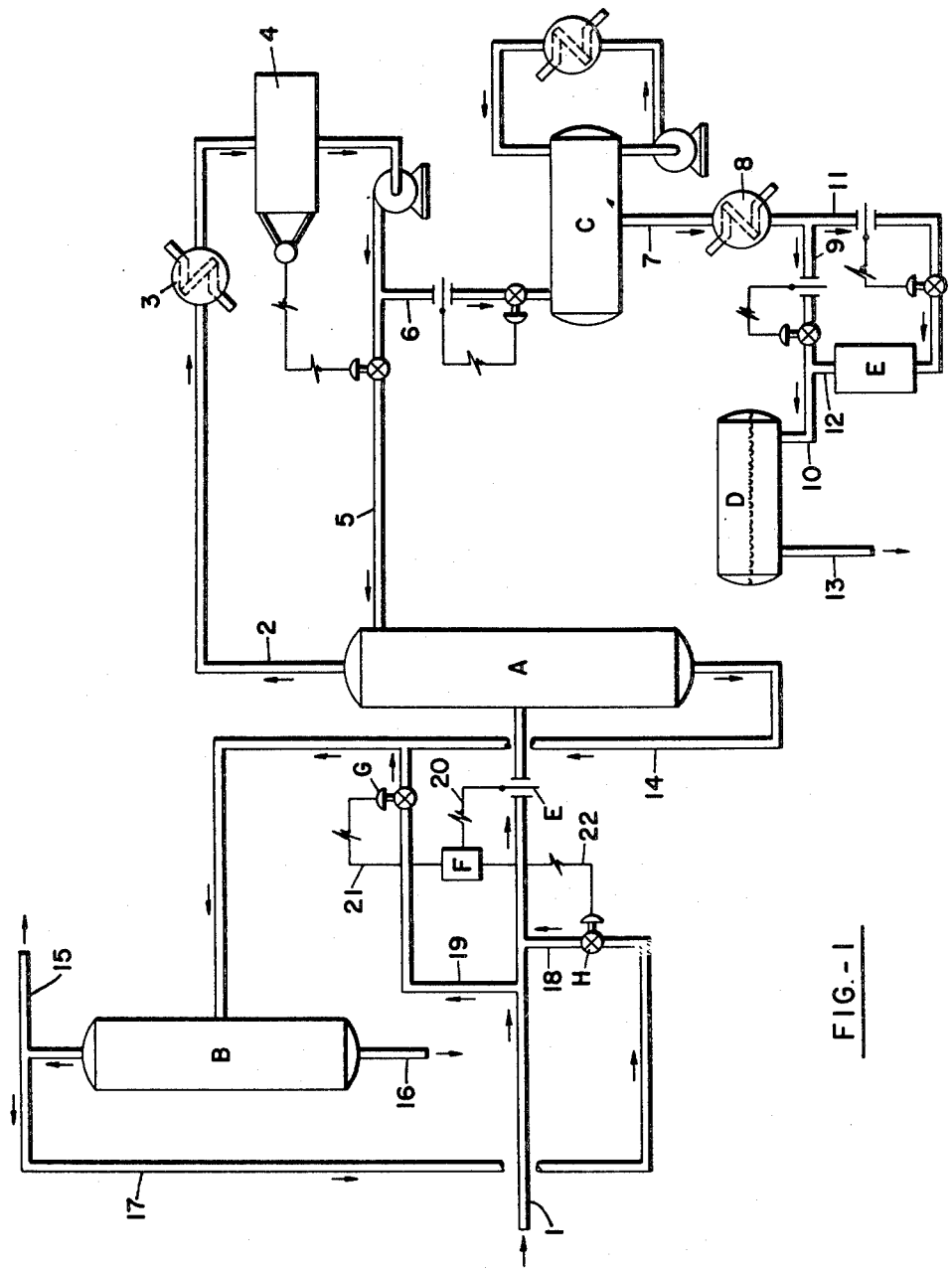

Roland T. Kelley Inventor

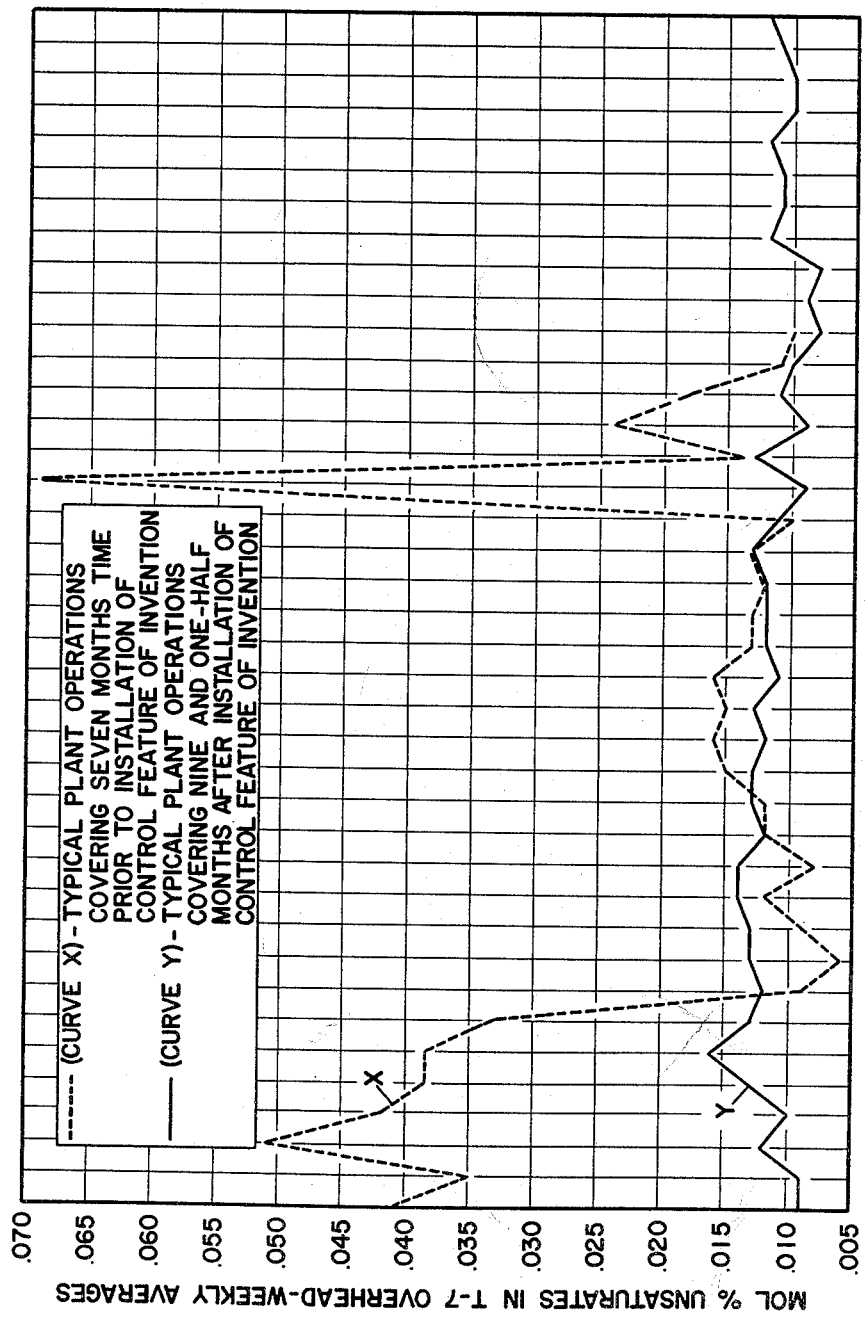

United States Patent Office 3,071,567
Patented Jan. 1, 1963

3,071,567
BUTYL RUBBER POLYMERIZATION SYSTEM
Roland Timothy Kelley, Baton Rouge, La., assignor to Esso Research and Engineering Company, a corporation of Delaware
Filed June 26, 1958, Ser. No. 744,791
2 Claims. (Cl. 260—85.3)

This invention relates to an improved method of obtaining accurate catalyst control in making high molecular weight isobutylene-containing polymers. More particularly, the invention relates to such polymerization systems in which the reactants are only polymerized to partial conversion, and in the presence of a volatile diluent, and in which both unreacted reactants and diluent must be recycled, some of the recycled diluent being used for preparation of catalyst solution. This application is a continuation-in-part of application Serial No. 443,119, filed July 13, 1954, now abandoned.

The invention has been found particularly applicable in the manufacture of butyl rubber, otherwise known as GR-1 synthetic rubber. This is made commercially by co-polymerizing a major proportion of isobutylene and a minor proportion of a conjugated diolefin of about 4–8 carbon atoms, such as isoprene, butadiene, piperylene, methylpentadiene, etc., in the presence of about 1–10 volumes, preferably about 2–5 volumes of methyl chloride or other lower halo-alkane of about 1–2 carbon atoms per volume of reactants, at a temperature between about 10° F. and —160° F., in the presence of a Friedel-Crafts catalyst such as aluminum chloride, boron fluoride, or other known materials, dissolved in a portion of the same diluent such as methylchloride. Generally, it is desirable to make such a copolymer of as high molecular weight as practical.

It should have a Staudinger molecular weight of at least 20,000 in order to be curable to a strong, tough, vulcanized synthetic rubber. Generally, molecular weights in the range of 30,000 to 60,000, or higher, are preferred. In commercial operation, the highest molecular weight polymers are obtained by stopping the polymerization substantially short of complete conversion, because if the conversion is carried to 100% the product will include some relatively undesirably low molecular weight polymers formed at the highest conversion. The commercially practical conversion range is about 50–70%.

This means that the 50–30% remaining unreacted polymerization monomers, such as isobutylene and isoprene, will then have to be flashed off, along with methylchloride diluent from the cold polymerization reaction slurry, and then these flashed vapors have to be separated in a series of distillation towers for recycling to the polymerization zone. The general method of accomplishing this recovery of polymer by discharging the polymerization slurry into a hot water flash tank and subsequent recovery of the flashed vapors for recycling, has been described in several earlier patents, such as 2,463,866 and 2,339,672.

For convenient reference, the pertinent part of such recovery system is described herebelow and in the accompanying drawing in which FIG. 1 represents a schematic layout of the suitable equipment for carrying it out, and FIG. 2 illustrates typical operations of a commercial unit before and after installation of the improvements of this invention.

According to usual procedure in the manufacture of butyl rubber from a feed of 97% isobutylene, and 3% isoprene, in 3 volumes of methylchloride, carried to 60% conversion, the unreacted hydrocarbon raw materials, namely isobutylene and isoprene, and the diluent methylchloride, which have been flashed off in the hot water flash tank, are then compressed, dried and fed to a series of distillation towers, from the first of which a high purity fraction of methylchloride is taken overhead, condensed, and used as solvent for preparing fresh catalyst solution. The bottoms from this first tower are then sent to the midpoint of the next main recycle distillation tower, from which the remainder, and major proportion of the methylchloride diluent is taken overhead, condensed, cooled, and recycled to the polymerization zone. The bottoms from this second tower with which the present invention does not deal, then is subjected to further purification and generally separation into the individual constituents, namely, isobutylene and isoprene for recycling to the polymerization zone.

In commercial plants involving the above-described process, there are generally a number of individual reactors so connected into the polymerization system that, for instance, two out of three reactors can be used for actual polymerization while one reactor is being cleaned, as there is always a certain amount of fouling of the reactors which takes place during the polymerization stage. As a result of the alternation in the cycles of the reactors, particularly at the time of shutting off one reactor or in starting another reactor, and especially in case two reactors are shut down at the same time, there are substantial fluctuations in the volume of the flashed vapors of unreacted reactants and methylchloride diluent which flow to the first distillation tower. Experience indicates that the volume flow of compressed vapors which are normally fed to that first distillation tower may often fluctuate ±25° from the average volume flow.

This means that there will be a resultant variation in the efficiency of the distillation in that tower and therefore there will be minor variations in the purity of the methylchloride which is taken overhead from this first tower for use as solvent in preparing fresh catalyst solution. Generally the variations in the purity of this methylchloride are so minor as to hardly be detectable. For instance, usually the amount of unsaturated impurities in the methylchloride, namely traces of isobutylene carried over in the distillation are maintained about 250 p.p.m., ±10 p.p.m. However, it must be appreciated that the impurities in the methylchloride which is then going to be used as solvent for making catalyst solution will have a greatly magnified effect in the polymerization step, chiefly because each pound of catalyst will produce an extremely large amount of polymer. For instance, the entire polymerization process becomes inoperable if the concentration of unsaturated impurities in the recycle catalyst solvent becomes as high as 900 p.p.m.

It is believed that the variation in the amount of unsaturates within the narrow range of less than 250 p.p.m. is primarily responsible for the tremendous variation in catalyst efficiencies from as little as 500 to as much as 3,000 lbs. of polymer produced per pound of catalyst.

The primary object of the present invention is to narrow down the variation in that trace of unsaturated impurities in the recycled methylchloride used as catalyst solvent, in order to narrow down the great fluctuations in catalyst efficiency. It is desirable to have a catalyst efficiency in the range of about 1,000 to 1,500 lbs. of polymer per lb. of catalyst, and to not have this efficiency fluctuate much beyond the stated range.

According to the present invention, this greater uniformity in control of catalyst efficiency is obtained by automatically maintaining a uniform volume flow of compressed vapors of unreacted reactants and methylchloride being fed into the first distillation tower. This is accomplished by automatically diverting any excess, above the desired predetermined amount, away from said first tower and bypassing it directly to the midpoint of the second distillation tower, and conversely in the case of deficiency of flow of compressed vapors to the first tower, automatically drawing the required amount from the overhead of the second tower.

This automatic control is preferably carried out by using a flow recorder controller in the first tower feed line, and connecting it with a split range controller which in turn will automatically operate a flow recorder controller valve to divert excess first tower feed to bypass the tower into the second tower, or will operate a flow recorder controller valve to withdraw overhead from the second tower to make up any deficiency in the feed to the first distillation tower. The flow recorder controller, the split range controller, and the flow recorder controller valves can all be suitably connected and operated by pneumatic connecting lines.

The details and advantages of the invention will be better understood from a consideration of FIG. 1 which shows the recycle tower feed coming from compressors (not shown) through line 1 for feeding into the first distillation tower A. The overhead vapors from tower A consisting essentially of relatively pure methylchloride, but containing traces of unsaturated impurities goes through line 2 to condenser 3, separator 4, from which part of the condensate, is refluxed through line 5 to the top of tower A and the remaining portion is pumped by line 6 to catalyst solvent storage tank C from which it is withdrawn through line 7 and passed through temperature regulator 8 for either warming or cooling as desired, and then split into two streams, the larger portion going directly through lines 9 and 10 into the catalyst solution supply tank D and the remaining and minor portion of the catalyst solvent from tank C being passed through line 11 through a container E which is filled with solid aluminum chloride from which the solution of about 4–5% concentration of aluminum chloride is discharged through line 12 into line 10 where it becomes reduced in concentration to about 0.10% aluminum chloride in methylchloride. The catalyst solution in the supply tank D does not remain there long as it is withdrawn continuously through line 13 to be recycled to the polymerization reactors (not shown). The bottoms from distillation tower A, consisting of the remaining amount of methylchloride, together with substantially all of the unreacted isobutylene and isoprene, are then passed by line 14 to the midpoint of the second distillation tower B from which the overhead, consisting essentially of methylchloride and perhaps about 3–10% isobutylene is taken off through line 15 for recycling to the polymerization reactors, not shown, with any desired purification. The bottoms from tower B consisting of a variable portion, such as 20–40%, of all of the recycled isobutylene and isoprene are taken off through line 16 and passed to further distillation and purification equipment, not shown, and finally recycled to the polymerization reactors, not shown.

A portion of the overhead from tower B consisting of relatively pure methylchloride may be withdrawn through line 17 for purposes of this invention and fed through line 18 back into original first distillation tower feed line 1 to supply any deficiency in the feed to the first tower.

On the other hand, if there is an excess of feed to this first tower the excess will be diverted through line 19 into line 14 and thence into the midpoint of the second distillation tower B.

This excess or deficiency of the flow to the first tower A is controlled by the flow recorder E operating in line 1 and it in turn is connected by pneumatic line 20 to the split range controller F which in turn is connected by pneumatic line 21 to the flow recorder controller valve G which will open to permit excess to bypass tower A and go directly into tower B, or will operate through pneumatic line 22 to open the flow recorder controller valve H to open and permit withdrawal of overhead from tower B through lines 17 and 18 into feed line 1, thereby maintaining uniform volume flow into the first distillation tower A.

This results in maintaining uniform trace impurities in the methylchloride recycled for preparation of catalyst solution, and consequently maintains uniform catalyst efficiency.

When the process described in FIG. 1 was operated for seven months without the flow recorder E, range controller F, and flow recorder controller valves G and H, the amount of unsaturated hydrocarbons taken off in the overhead from tower A varied between 0.005 and 0.07 mole percent as shown by curve X in FIG. 2. However, when these controls were installed and the process operated for nine and a half months exactly as described in FIG. 1, there was very little fluctuation in the amount of unsaturated hydrocarbons taken overhead from tower A and furthermore the amount was at all times between 0.0055 and 0.017 mole percent as shown by curve Y in FIG. 2.

This process is also applicable not only to the preparation of butyl rubber but also to other high molecular weight isobutylene-containing polymers such as simple polyisobutylene or copolymers of isobutylene containing for instance 1–90% of styrene or other polymerizable monoolefinic compounds containing an aromatic nucleus such as p-methyl styrene, indene, vinylnaphthalene, etc.

The nature of the present invention having been thus fully set forth and specific examples of the same given, what is claimed as new and useful and desired to be secured by Letters Patent is:

1. In a continuous process for manufacturing high molecular weight polymers from a major proportion of isobutylene and a minor proportion of conjugated diolefins containing 4 to 8 carbon atoms at substantially less than complete conversion in a system employing a plurality of reaction zones in alternating cycle, wherein the reactants are mixed with a volatile diluent consisting of halo-alkanes containing 1 to 2 carbon atoms, cooled to a temperature between about 10° F. and −160° F., and contacted with a solution of Friedel-Crafts catalyst dissolved in some of said same diluent to effect polymerization to the desired extent of conversion, the resulting cold dispersion of polymer in diluent and unreacted reactants then being discharged into a hot water flash tank to convert the polymer into an aqueous slurry, and to flash off the volatile diluent and unreacted reactants, said flashed materials being then compressed, dried, and fed to a series of distillation towers, from the first of which diluent containing traces of reactants is taken overhead, condensed and used as solvent for preparing fresh catalyst solution, and a bottoms fraction containing the diluent and substantially all of the reactants is sent to a second main recycle distillation tower from which the remainder and main portion of the diluent containing 3 to 10% isobutylene is taken overhead for recycling to the polymerization zone, there being substantial fluctuations in the volume of flow throughout said system with resultant minor though substantially undetectable variations in the purity of the diluent recycled for catalyst preparation, which however cause greatly magnified variations in catalyst efficiency, the improvement which comprises maintaining at all times a substantially constant amount of material flowing into said tower by automatically diverting the excess flow above said constant amount away from said first tower and bypassing it directly to the midpoint of said second distillation tower, and conversely, in case of deficiency of flow to said first tower, to draw automatically the required amount from the second tower overhead, with the resultant production of fresh catalyst solution of substantially uniform catalyst efficiency.

2. A process according to claim 1 in which the diluent is methyl chloride.

References Cited in the file of this patent

UNITED STATES PATENTS

| | | |
|---|---|---|
| 2,401,754 | Green | June 11, 1946 |
| 2,844,569 | Green et al. | July 22, 1958 |
| 2,890,156 | Vautrain | June 9, 1959 |

FOREIGN PATENTS

| | | |
|---|---|---|
| 554,242 | Belgium | Feb. 15, 1957 |

OTHER REFERENCES

"Instruments & Process Control" by N.Y. State Vocational and Practical Arts Assn., 1945, pages 160–162.